April 30, 1946.  F. W. CLARK  2,399,541
SAW
Filed March 24, 1944  2 Sheets-Sheet 1
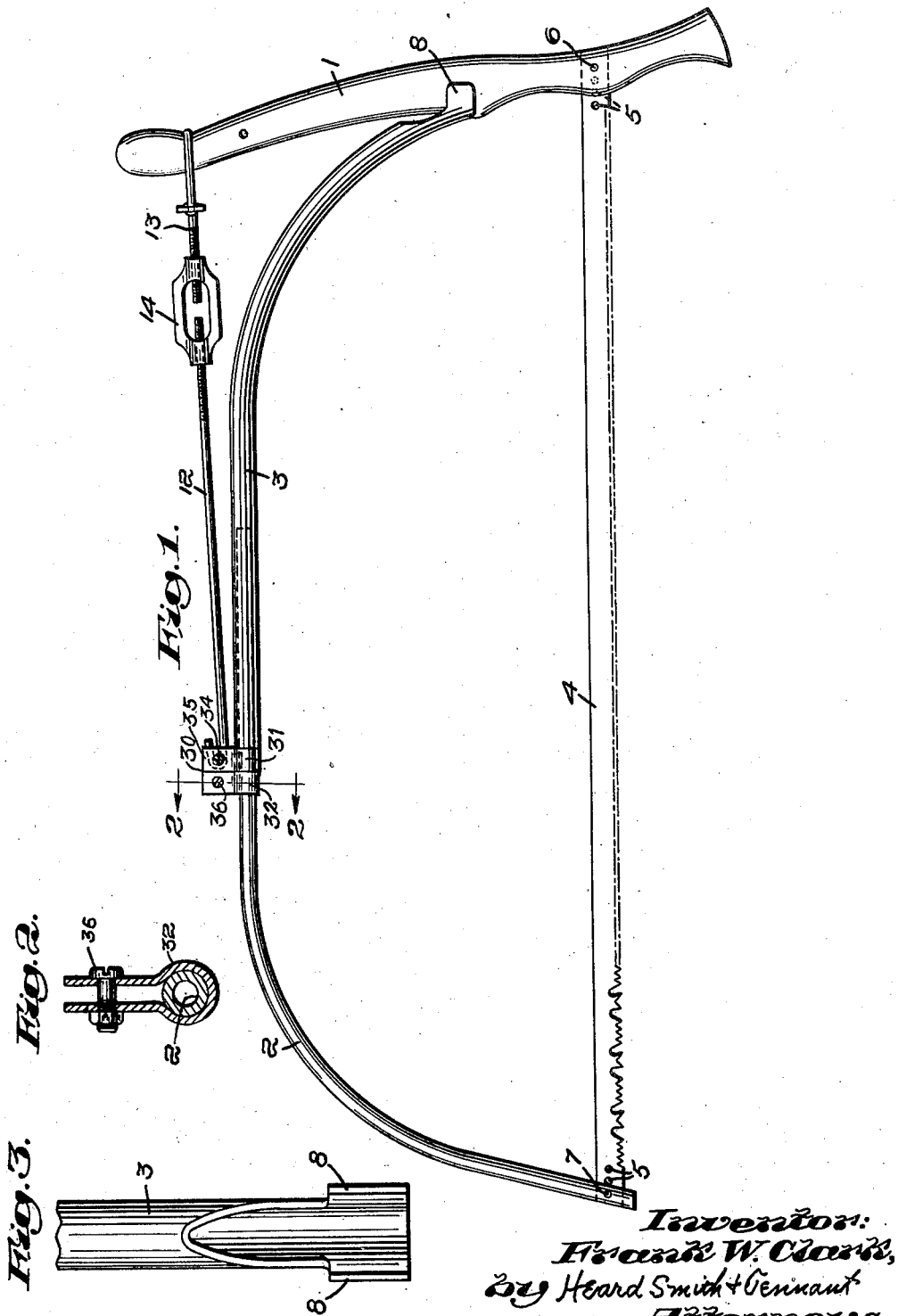

April 30, 1946.　　　F. W. CLARK　　　2,399,541
SAW
Filed March 24, 1944　　　2 Sheets-Sheet 2
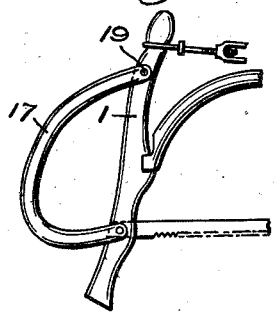
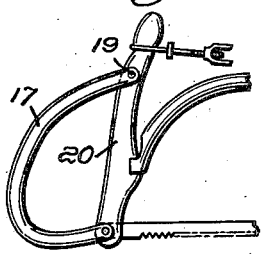
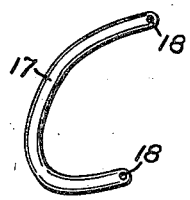
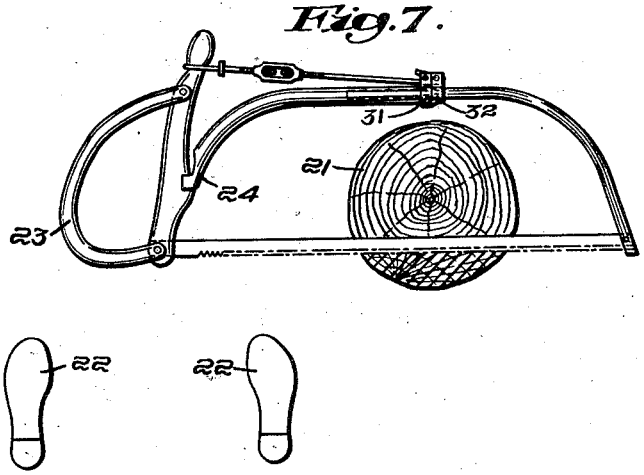
Inventor:
Frank W. Clark,
by Heard Smith & Tennant
Attorneys Patented Apr. 30, 1946

2,399,541

UNITED STATES PATENT OFFICE 2,399,541

SAW

Frank W. Clark, Sanford, Maine

Application March 24, 1944, Serial No. 527,971

1 Claim. (Cl. 145—34)

This invention relates to a saw particularly of that type employed for hand operation in the sawing of wood.

The object of the invention is to provide a construction of saw adapted for efficient use by one man either when operated in a horizontal plane as in the cutting down of a tree, in sawing up a log lying flat upon the ground, or in sawing logs supported on a sawbuck or raised from the ground, which shall have the proper balance for any use to which it may be put, which shall have the hand holds conveniently arranged for the desired purposes, which shall be adjustable to provide for different lengths of saw blades, and which shall be provided with a unitary duplex clamp for adjusting the length of the frame and preventing relative rotation of the frame parts.

The objects of the invention will appear more fully from the accompanying description and drawings and will be particularly pointed out in the claim.

The drawings illustrate preferred forms of construction embodying the invention.

In the drawings:

Fig. 1 is an elevation of a complete saw embodying a preferred form of the invention;

Fig. 2 is a view on larger scale chiefly in cross section taken on the line 2—2 of Fig. 1;

Fig. 3 is an end elevation of the portion of the right hand end of the frame shown in Fig. 1;

Fig. 4 is a detail in elevation of the end portion of a saw fitted with an auxiliary handle employed when the saw is operated in a horizontal position;

Fig. 5 is a similar detail of a saw provided with another form of handle member and also with the auxiliary handle to facilitate the operation of the saw when operating vertically close to the ground;

Fig. 6 is a view of the auxiliary handle;

Fig. 7 is a view illustrating the position and operation of a saw when operated horizontally as in the cutting down of a tree.

The saw of this invention is of that type provided for use by one man for all wood-sawing purposes, either in cutting down a tree, in cutting up logs lying upon the ground, or in such sawing operations as are usually performed by a bucksaw. The advantages of a saw of this type over a crosscut saw are that a much narrower kerf is cut and less labor is required in the sawing operation. But to procure these advantages it is necessary that the comparatively thin saw blades be held and maintained under strong tension.

In the present invention the saw frame is of general C-shape to provide for the required depths of cut and is adjustable in length to provide for different lengths of saw blades. This frame may be made of any suitable material, but is preferably formed of a strong metal tube. The frame acts as a strut between the handle member, to which one end of the saw blade is attached, and the other end of the saw blade, while an adjustable tension member removably connects this strut to the handle member against which this strut abuts so that the handle member acts as a lever in applying and maintaining the required tension.

In the construction illustrated in Figs. 1, 2, and 3, the handle member 1 is substantially straight, preferably formed of wood, and curved to provide suitable areas to be grasped by the hands or hand holds. The frame is shown as formed of two telescoping cylindrical parts each of metal tubing with the part 2 further from the handle telescoping within the part 3. The saw blade 4 is usually provided at each end with a plurality of holes 5. This blade is readily connected at one end to the handle 1 by passing through a slot therein and being secured in place as by a pin or bolt 6 and similarly at the other end it is connected by a pin or bolt 7 to the frame part 2 or outer end of the frame. The inner end of the frame part 3 toward the handle is forked in shape, the tubular portion, for example, being cut away as shown in Fig. 3, and bent to present the side flanges 8. The handle member at a point well above its pivotal connection 6 to the saw blade is embraced by, seated against and fulcrumed in this forked end of the frame so that the frame forms a strut between this fulcrum point and the pivotal point 7 at the other end of the saw blade.

An adjustable link connection is provided between the upper end of the handle member and a clamp located midway of the length of the C-shaped frame. With the two-part frame illustrated the parts of the frame may be adjusted to fit saw blades of substantially different lengths or adjusted slightly by means of the holes 5 to vary the angle between the handle member and the saw blade and in either case when the frame parts have been adjusted to the required position the clamp acts to prevent any relative rotation of the frame parts and at the same time holds the frame in any adjusted length. The clamp is a unitary duplex metal device split partially at 30 to form two sections 31 and 32. The section 31 is clamped firmly on the telescoped end of the frame part 3 by means of a bolt 34 passed through the upturned ears 35 of the section 31 and in a similar manner the section 32 is clamped firmly and independently on the telescoping end of the frame part 2 by a bolt 36.

The tension member is an adjustable link connecting the upper portion of the handle member 1 to the clamp. This adjustable link is shown as comprising two metal rods 12 and 13 having screw threaded to the ends thereof the interposed turnbuckle 14. The free end of the rod 12 is hook-shaped to engage the bolt 35 of the clamp and the free end of the rod 13 is formed into a loop which may be slipped over the upper end of the handle member. It will thus be seen that by screwing up the turnbuckle 14 a heavy tension may be placed upon the saw blade by reason of its connection to the strut frame member upon which the handle member acting as a lever fulcrums. It will also be seen that the saw frame may be readily adjusted to various lengths of saw blades and that all the elements of the saw are firmly held in operative position and yet are readily taken apart because the adjustable link member when loosened up slips off of the end of the handle and unhooks from the clamp, while there is no connection at the point where the handle fulcrums on the forked end of the frame.

While a two-part metal tubular frame has been illustrated it will be understood that for some purposes the frame may comprise combinations of wood and metal, or other suitable material may be employed.

The principle of construction employed in this invention enables handles of different types readily to be employed and interchanged according to the work to be performed by the saw. A handle such as illustrated in Fig. 1 with a hand hold below the saw blade and conveniently grasped by the hand at any point above the saw blade is useful for a wide variety of purposes, but is objectionable when a heavy log lying flat upon the ground is to be cut. So also it is awkward with such a handle to operate the saw in a horizontal plane as when cutting down a tree. The invention therefore provides for the employment of a handle of any suitable shape for the required purpose and in addition for an auxiliary bow-shaped handle which may be removably attached at its ends to whichever handle member may be employed. Such adaptability of the saw for different purposes is illustrated in Figs. 4, 5, 6, and 7. An auxiliary bow-shaped handle 17 is illustrated in Fig. 6 and is provided with holes 18 at its ends by which it may be connected to the main handle member as, for example, by the bolt or pin connecting the saw blade to the handle member and by a bolt or pin 19 at the upper end. Such a construction is shown in Fig. 4. This is a convenient arrangement for some purposes. In Fig. 5 the auxiliary handle 17 is shown connected to a main handle member 20 which does not project below the saw blade. This is a convenient form for sawing a log lying upon the ground and it is also a convenient form when the saw is to be operated for cutting down a tree.

In Fig. 7 the saw is shown equipped for thus cutting down a tree 21. Here the operator would stand, as indicated by the footmarks 22, grasping the auxiliary handle at about 23 with one hand and the frame at about 24 with the other. This enables the saw to be swung easily and efficiently in a horizontal plane and provides the proper balance.

The invention thus presents a simple, highly efficient and practical saw frame adapted for operation by one man under all required conditions.

Having thus described the invention, what is claimed as new and desired to be secured by Letters Patent is:

A saw comprising a C-shaped frame formed in two telescoping cylindrical sections, a substantially straight handle member, a saw blade removably and pivotally connected at one end to the outer end of the frame and at the other end to the handle member, with the handle member at a point well above the pivotal connection with the blade fulcrumed on the inner end of the frame, a unitary duplex clamp having one clamping section clamped on the telescoped end of the frame part and the other clamping section independently clamped on the telescoping frame part acting to prevent any relative rotation of the frame parts and at the same time enable the length of the frame to be adjusted, and an adjustable link connecting the upper portion of the handle member and the clamp acting to hold the blade under my desired degree of tension.

FRANK W. CLARK.